US005607204A

United States Patent [19]
Gryp

[11] Patent Number: 5,607,204
[45] Date of Patent: Mar. 4, 1997

[54] ADJUSTABLE VEHICLE SEAT

[75] Inventor: Dennis Gryp, East Moline, Ill.

[73] Assignee: Sears Manufacturing Company, Davenport, Iowa

[21] Appl. No.: 482,615

[22] Filed: Jun. 7, 1995

[51] Int. Cl.[6] ............................................. A47C 3/025
[52] U.S. Cl. ............................ 297/284.11; 297/337
[58] Field of Search ................................. 297/337, 338, 297/339, 313, 311, 284.11, DIG. 8

[56] References Cited

U.S. PATENT DOCUMENTS 3,286,971  11/1966  Walter et al. .................... 297/337 X
4,636,002  1/1987  Genjiro ........................ 297/284.11 X
5,366,272  11/1994  Lebrun ........................... 297/337 X

FOREIGN PATENT DOCUMENTS 75842    4/1984   Japan ........................ 297/284.11
36029    2/1986   Japan ........................ 297/284.11
253280   6/1926   United Kingdom ............ 297/337
1202017  1/1969   United Kingdom ............ 297/337

*Primary Examiner*—Laurie K. Cranmer
*Attorney, Agent, or Firm*—Niro, Scavone, Haller & Niro

[57] ABSTRACT

An adjustable seat bottom support assembly which allows the seat bottom to slide fore and aft relative to the seat backrest and which allows the front portion of the seat bottom to raise and lower vertically for greater comfort and thigh and leg support for a range of sizes of seat occupants.

8 Claims, 4 Drawing Sheets

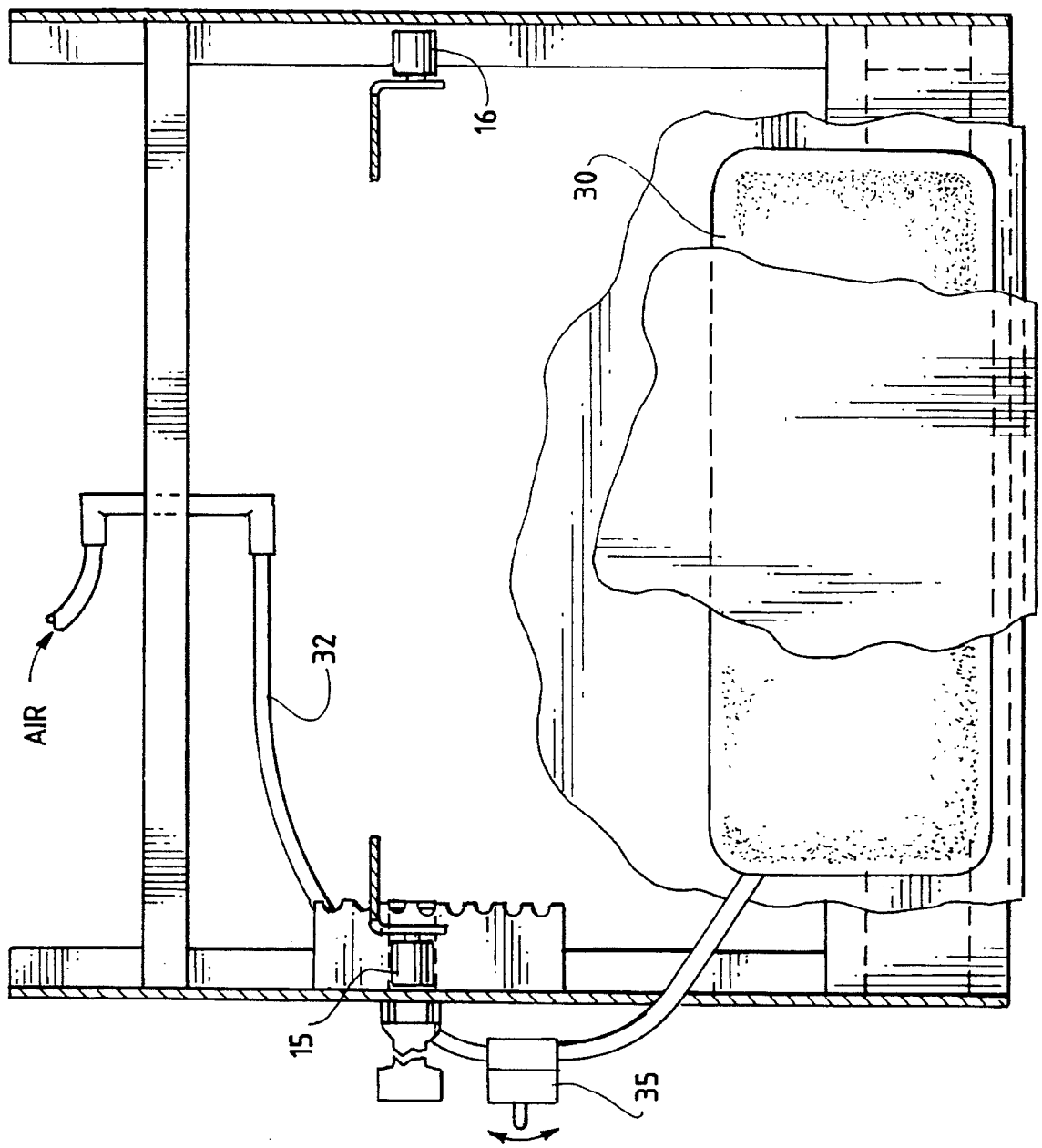

ADJUSTABLE VEHICLE SEAT

BACKGROUND OF THE INVENTION

The present invention relates generally to an adjustable seat support assembly and, more particularly, to a vehicle seat adjustment assembly which further provides for mechanical and pneumatic adjustment of the seat cushion allowing the seat cushion to slide fore and aft and allowing the front portion of the seat cushion to raise and lower vertically about a common pivot.

Vehicle seats generally are adjustable in that the entire seat, including the backrest, is slidable and the backrest generally is adjustable relative to the seat bottom. A feature of a vehicle seat not readily available is a seat which allows such adjustability and which also allows the seat cushion to adjust fore and aft independent of the backrest and vertically providing for greater variation in passenger height and thigh support.

The present invention provides an efficient and economical mechanical and pneumatic seat adjustment assembly which allows the seat cushion to adjust fore and aft relative to the seat backrest and also raises or lowers the front of the seat cushion.

SUMMARY OF THE INVENTION

A primary object of the present invention is to provide a seat support assembly which allows seat cushion adjustability to provide an occupant with greater comfort and thigh support. The present invention allows a seat occupant to adjust the seat cushion fore and aft to provide for greater seat cushion length relative to the backrest. The present invention, therefore, accommodates seat occupants of a wide range of heights. The present invention also allows the front portion of the seat cushion to be raised or lowered independently of the fore and aft adjustment and of the seat backrest. The present invention, thus, accommodates a wide range of sizes of seat occupants with a comfortable vehicle seat which provides variation in thigh support.

Therefore, according to the present invention, an adjustable seat is provided comprising a backrest and a seat bottom, the seat bottom having rollers on which the seat bottom moves fore and aft relative to the backrest and on which the seat bottom can pivot, and a pneumatic elevation means located at the front of the seat bottom to allow vertical adjustment thereof. The pneumatic means, which travels with the seat bottom, can raise the front portion of the seat bottom, which pivots on the rollers, to provide increased adjustability and thigh support.

An object of the present invention is to provide a seat support which allows the seat cushion to move relative to the backrest.

Another object of the present invention is to provide a seat support which allows the front portion of the seat cushion to be raised and lowered to provide thigh support.

A further object of the present invention is to provide a seat support which allows a seat cushion to move relative to the seat backrest on a track and to allow the front portion of the seat cushion to pivot on an axis defined by the track.

An additional object of the present invention is to provide mechanical and pneumatic means to facilitate seat cushion movement and pivotal adjustment.

A further object of the present invention is to provide pneumatic operational means which is currently available on many vehicles to operate the seat cushion pivot.

DESCRIPTION OF THE DRAWINGS

The novel features which are characteristic of the present invention are set forth in the appended claims. However, the invention's preferred embodiments, together with further objects and attendant advantages, will be best understood by reference to the following detailed description taken in connection with the accompanying drawings in which:

FIG. 5 is a cross-sectional view taken along line 5—5 of FIG. 1.

DETAILED DESCRIPTION OF THE PREFERRED EMBODIMENT

Figure 1:
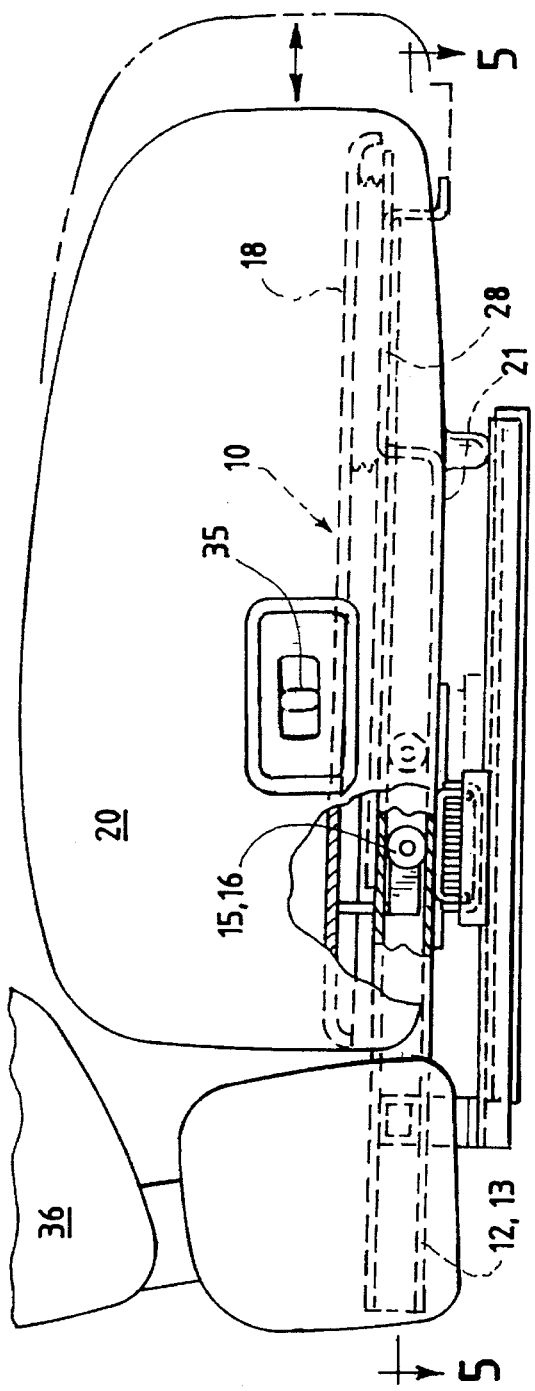
FIG. 1 is a cross-sectional view of the present invention.
Figure 2:
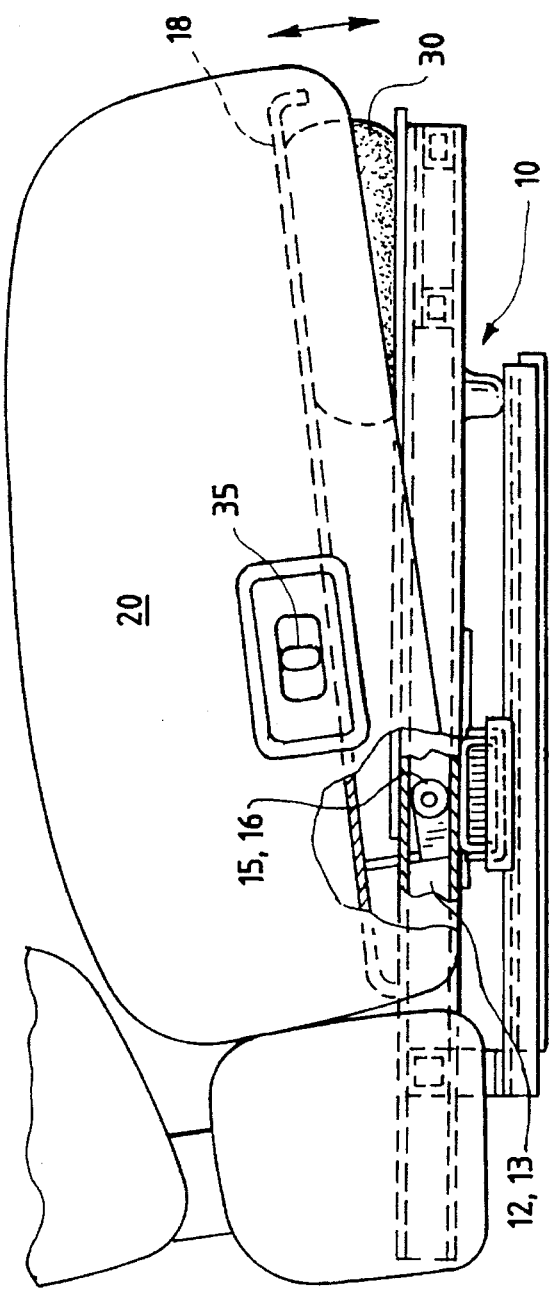
FIG. 2 is a cross-sectional view of the present invention similar to FIG. 1, but showing the seat bottom cushion rotated upward.
Figure 3:
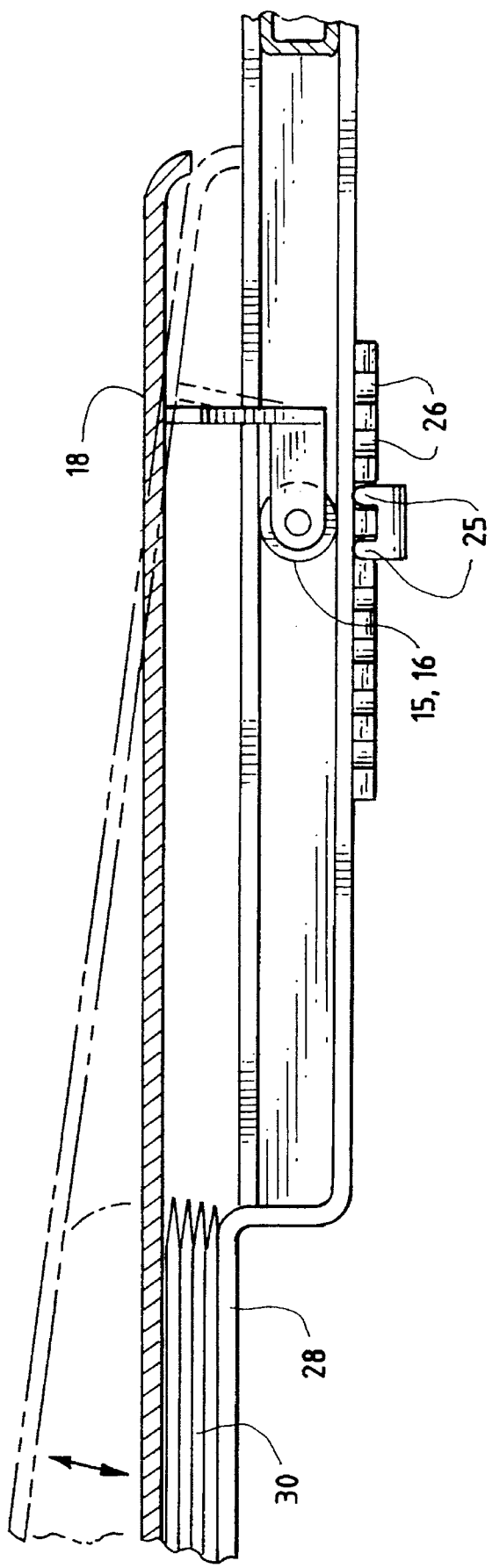
FIG. 3 is a partial cross-sectional view of the seat bottom cushion support.

The preferred embodiment of the seat adjustment assembly, as shown in FIG. 1 and designated generally 10, utilizes a seat bottom support plate 18, and a seat support frame 21 having parallel slide tracks 12, 13. Depending from support plate 18 are rollers 15, 16 which rotate around a common axis 33 and which reside within tracks 12, 13. Seat bottom cushion 20 is supported by support plate 18. Seat backrest 36 is immovably mounted with respect to frame 21. Thus, cushion 20 is slidably adjustable on rollers 15, 16 within tracks 12, 13 relative to backrest 36.

Figure 4:
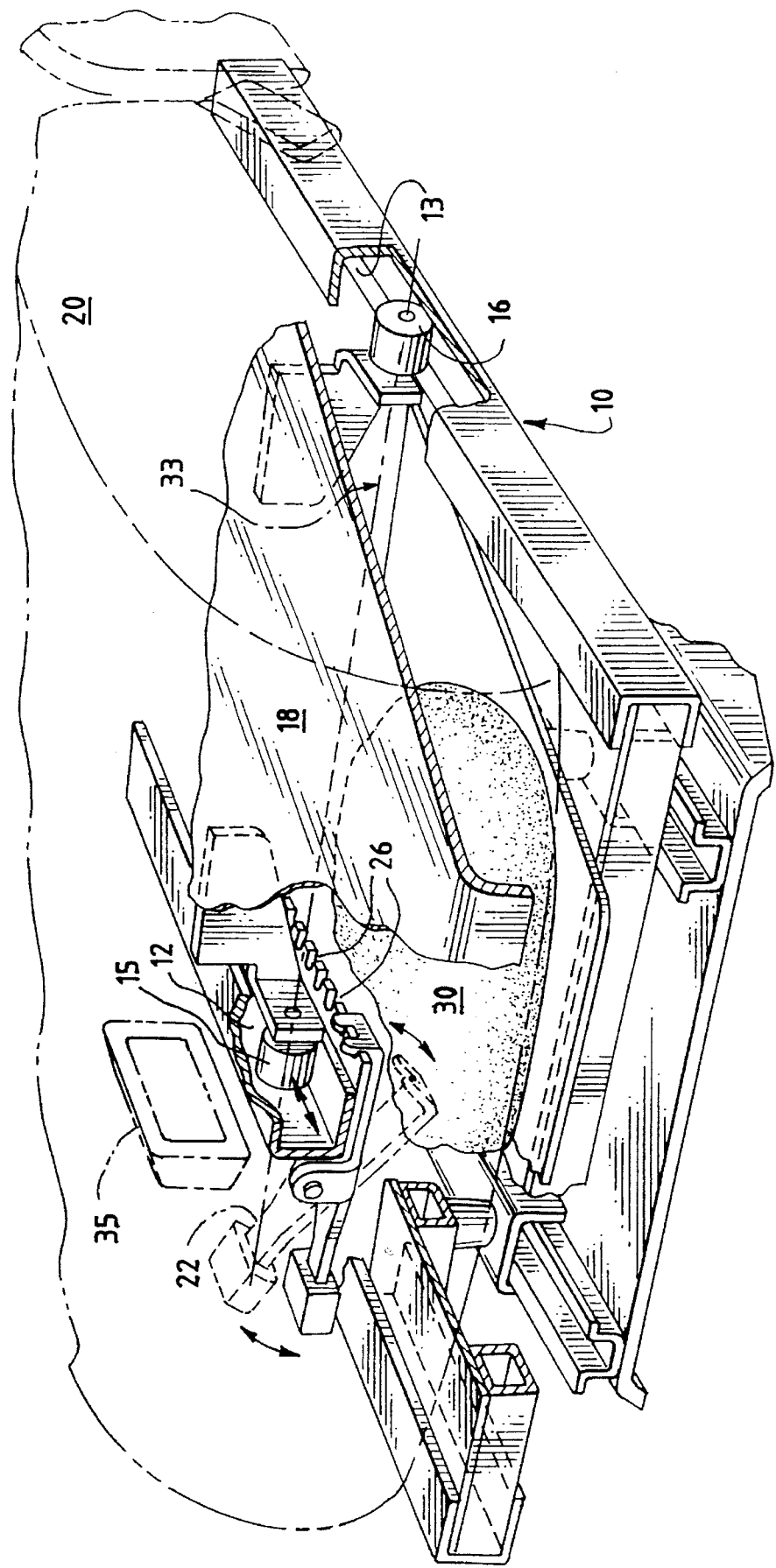
FIG. 4 is a perspective view of the present invention.

Slidable adjustment of cushion 20 is accomplished by means of a slide actuator 22 (FIG. 4) conveniently located with respect to cushion 20. Actuator 22 is pivotally mounted to seat bottom support plate 18. It extends under the seat support structure and has a plurality of teeth 25 which are disposed to engage and disengage a plurality of spaced openings 26 in the support frame 21 to alternatively prevent and allow seat cushion support 18 fore and aft movement.

A pneumatic lifter support pan 28 extends between tracks 12, 13 near the front of the seat bottom cushion 20. Situated on pan 28 and between support pan 28 and seat bottom support plate 18 is an air bag 30. Air bag 30 extends along the front portion of seat bottom support plate 18 and is connected to hose 32 (see FIG. 5) which provides pressurized air to air bag 30 and allows discharge of pressurized air from air bag 30 through an air valve 35. Air pressurized to about 6–10 p.s.i. and most preferably about 8 p.s.i., has been found to be the most suitable pressure. When pressurized air is provided to air bag 30, air bag 30 expands and exerts an upward force on the front portion of seat bottom support plate 18. This force causes the front portion of support plate 18 to rise and pivot on rollers 15, 16. When the pressurized air is released from air bag 30, the gravitational force from the weight of the seat occupant and/or seat bottom cushion 20 cause the seat bottom cushion 20 to descend.

Pressurized air can be supplied from any source and is preferably provided from the vehicle in which the seat resides. Hose 32 has a means 35 for allowing or preventing air flow through hose 32. Preferably, air flow actuator means 35 is a common rocker valve well known to those of ordinary skill in the art.

Air bag support pan 28 is connected to seat bottom support plate 18 so that when seat cushion 20 slides fore or aft, support pan 28 also slides and maintains its position relative to seat cushion 20.

The present invention thus provides an adjustable seat support assembly which allows seat cushion fore and aft adjustment and is also tiltably adjustable to accommodate a wide range of seat occupants and which provides complete thigh and leg support for a wide range of seat occupants.

Of course, it should be understood that various changes and modifications to the preferred embodiments described herein will be apparent to those skilled in the art. Other changes and modifications, such as those expressed here or others left unexpressed but apparent to those of ordinary skill in the art, can be made without departing from the spirit and scope of the present invention and without diminishing its attendant advantages. It is, therefore, intended that such changes and modifications be covered by the following claims.

What is claimed is:

1. An adjustable seat comprising:

a frame having a pair of tracks;

a backrest mounted to the frame;

a seat having a front and rear and mounted on a seat support plate, said support plate including a pair of depending rollers movably restrained within said tracks to permit fore and aft movement of said seat relative to said backrest;

an inflatable bag positioned below and engageable with said support plate for rotating said support plate relative to said frame and wherein said rollers act as the pivot point for said support plate to thereby adjust the vertical height of the front of said seat; and a pressurized air supply and a conduit forming a pressurized air path between said air supply and said inflatable bag and having a manually actuatable valve to allow air into said bag and to vent air from said bag to modulate the height of the front of said seat.

2. The adjustable seat of claim 1 further comprising latch means operably attached to the support plate to allow and prevent said fore and aft movement.

3. The adjustable seat of claim 1 wherein the pair of tracks extends substantially the entire length of said frame.

4. The adjustable seat of claim 1 wherein the pair of depending rollers is located at substantially the rear of said seat.

5. The adjustable seat of claim 1 wherein the inflatable bag is secured to the support plate for lateral movement therewith.

6. The adjustable seat of claim 1 wherein the frame includes a support substantially at the front of the seat and carries the inflatable bag.

7. The adjustable seat of claim 1 wherein the manually actuatable valve is a rocker valve.

8. The adjustable seat of claim 7 wherein the rocker valve is positioned on said seat.

\* \* \* \* \*